(12) United States Patent
West

(10) Patent No.: X4632
(45) Date of Patent: Jan. 10, 1827

(54) PLANE IRONS

(76) Inventor: Charles E. West

Charles E. West

Letters Patent

The schedule referred to in these Letters Patent and making part of the same containing a description in the words of the said Charles E. West himself in making irons for planes and jointers, double and single, and of all sizes and shapes, by rolling together the steel and iron, The bar of iron may be split on the edge, and the steel put in and welded, or the steel may be welded on the outside of a bar of iron; or between two bars of iron of sufficient thickness, that when heated and rolled in a common rolling mill to a suitable thickness, so that the width of the plate will make the length of the plane iron or jointer iron; the plate then must be cut into pieces of sufficient width for the plane or jointer iron, and then tempered, ground and polished Dated at Colchester the 27th day of December 1826

Witnesses
Samuel A Peters
Newhall Painter

Charles E. West

[illegible]
[illegible]